Patented Nov. 24, 1942

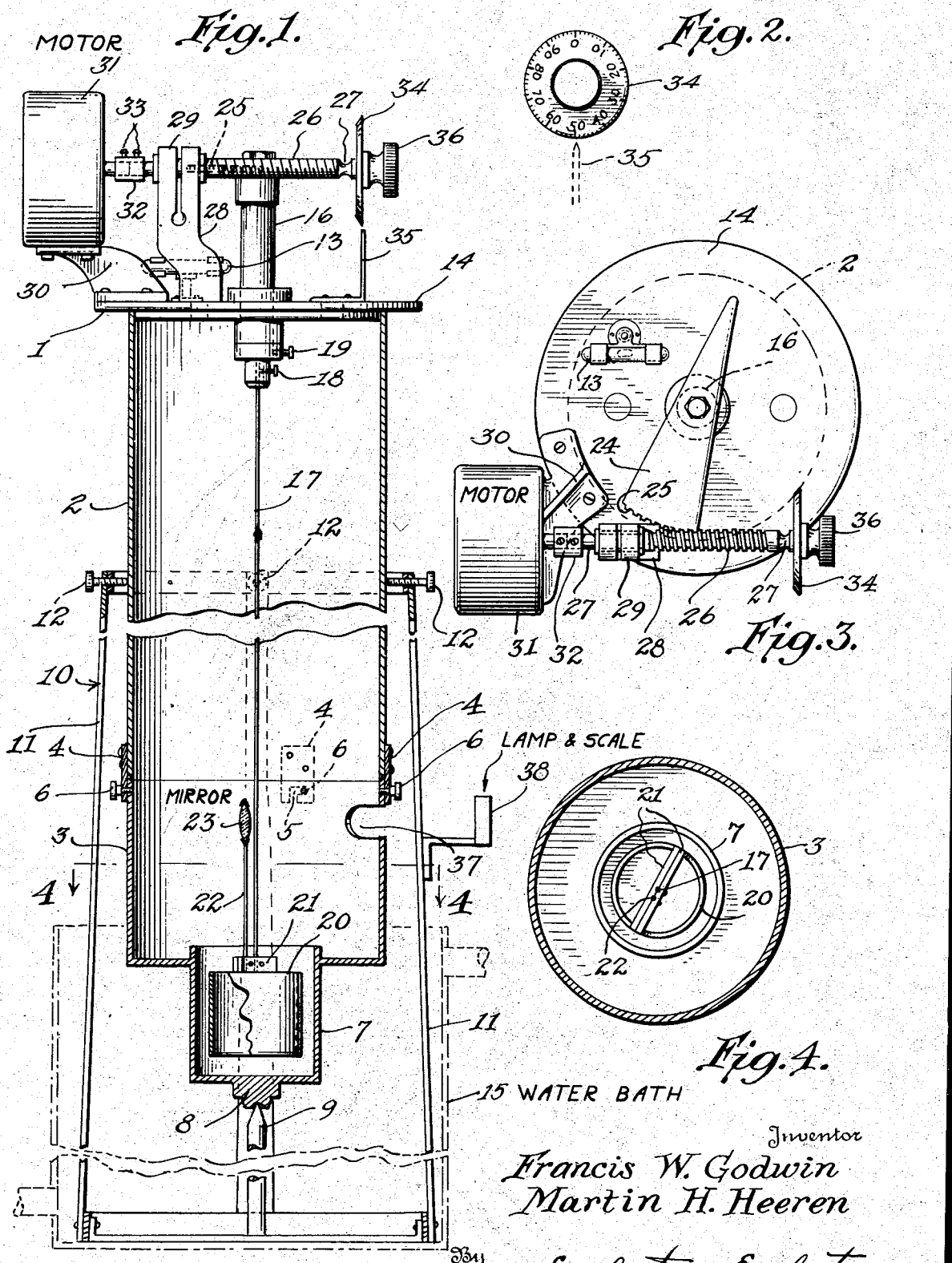

2,303,162

UNITED STATES PATENT OFFICE 2,303,162

APPARATUS FOR MEASURING THIXOTROPY

Francis W. Godwin and Martin H. Heeren, Chicago, Ill., assignors to Carter Coal Company, New York, N. Y., a corporation of Delaware Application August 13, 1940, Serial No. 352,469

4 Claims. (Cl. 265—11)

This invention relates to force measuring devices and is concerned particularly with an apparatus for measuring the thixotropic properties of liquids such as fuel oils.

The term thixotropy has been applied to a property of certain liquids to resist small shearing forces, as if a semi-rigid network or gel structure existed in them. Liquids having this property of resisting small shearing forces will nevertheless flow upon the application of a slightly greater shearing force and will in every way act as an ordinary liquid should. Upon being allowed to stand quiescent, however, such liquids will again assume their resistance to small shearing forces.

The amount of shear resistance in thixotropic liquids is exceedingly small, in fact so small as to ordinarily pass unnoticed. Nevertheless the resistance is often great enough to be of considerable value in that it will support in suspension small particles such as appear in coal dust, etc. Obviously, the greater the degree of thixotropy in a liquid the greater the percentage by weight of powdered material which can be suspended therein. Hence it is often highly desirable to determine the degree of thixotropy in various liquids for commercial purposes.

In view of the foregoing it is an object of the present invention to provide an instrument for accurately measuring the shearing force of liquids under uniform conditions.

Another object of the invention resides in the construction of a thixotrometer which is highly sensitive and consequently capable of measuring extremely small forces such as the shearing forces of liquids having varying degrees of the thixotropic property.

Other objects and advantages of the invention will be apparent from the following description when taken in connection with the accompanying drawing in which, Figure 1 is a vertical sectional view through the apparatus, parts being indicated in dotted outline.

Figure 2 is a detail elevational view of a disc and scale.

Figure 3 is a plan view of the apparatus, and

Figure 4 is a section taken on line 4—4 of Figure 1.

Referring to the drawing in more detail the numeral 1 indicates generally one embodiment of a force measuring instrument for measuring small shearing forces in various liquids, but it will be understood that the instrument may take other forms without changing the basic principles involved.

Numeral 2 indicates the upper portion of a cylindrical casing formed of brass or the like, while numeral 3 indicates the lower section of the casing. The sections 2 and 3 may be detachably connected by bayonet joints consisting of the plates 4 secured to the upper section 2 and provided with L-shaped slots 5, and screws 6 secured to the lower section 3 for cooperation with the slots. It will be apparent that by loosening the screws 6 and slightly rotating the lower section the same may be readily detached from the upper section. A reversal of the operations will, of course, provide a rigid connection between the upper and lower sections of the casing.

Fixed to or integrally connected with the bottom of section 3 is a sample cup 7. This cup is open at its upper end and is in communication with the casing or jacket 2—3. The upper end of the cup preferably extends slightly above the bottom of section 3 of the casing so as to provide an annular overflow chamber around the cup. On the exterior of the bottom of the cup 7 is a bearing member 8 adapted to rest upon a pivot point 9 of a supporting frame 10. The legs 11 of the frame 10 are provided with screws 12 which lightly contact the jacket or casing 2—3 and thus serve as a means for leveling the apparatus in cooperation with a pivoted level 13 mounted on a head 14 of the casing.

A water bath 15 may be employed to maintain a uniform temperature in the sample cup and preferably should extend slightly above the bottom of the casing 3.

Rotatably mounted in the head 14 is a vertical shaft 16 from which is suspended a torsion wire 17. Set screws 18 and 19 serve to detachably connect wire 17 to the torsion head 16, and secured to the lower end of the wire is an open-ended cylindrical rotor 20, preferably of aluminum, and of slightly less diameter than the sample cup 7. Any suitable means may be employed for attaching the torsion wire to the cylinder 20, and in the embodiment of the invention shown herein the means comprises a pair of clamping plates 21. These plates are secured at their ends to the upper end of cylinder 20 and grip the lower end of wire 17 at their center. Also mounted on the clamp 21 is a rod 22 which serves as a support for a mirror 23 as will appear hereinafter.

Fixed to the upper end of the torsion head or shaft 16 is a horizontally extending arm 24 having an arcuate end 25 cut into the form of a section of a worm wheel for cooperation with a worm 26 formed on a horizontal shaft 27. A standard 28 mounted on the head 14 of the casing 2, is provided with a bearing 29 at its upper end for rotatably supporting the shaft 27. A second standard 30 secured to the upper surface of head 14 forms a support for a worm clock motor 31. The shaft of the motor 31 and the shaft 27 may be releasably coupled by a sleeve 32 and set screws 33.

Affixed to the outer end of the worm shaft 27 is a calibrated disc 34 for cooperation with a pointer 35 mounted on the head 14. A knob 36 is secured on the outer end of shaft 27 for manual operation thereof under certain conditions.

As will be noted from an inspection of Figure 1, the lower section 3 of the casing is provided with an arcuate slot 37 at the height of the mirror 23 which is supported on the rotor 20. An ordinary lamp and scale assembly represented generally at 38, is mounted for cooperation with the slot 37 and mirror 23.

In the operation of the measuring instrument, the sections 3 and sample cup 7 are removed from the main body of the casing, and a sample of the oil or other liquid to be tested is placed in the cup. This part of the apparatus is then reattached to the main casing 2 and placed in the supporting frame 10 with the bearing 8 supported on the pivot point 9. The screws 12 are then manipulated in conjunction with the level 13 so as to bring the instrument into exact vertical position with the rotor 20 concentrically arranged in the cup 7. The bath 15 may be placed in operation if desired.

Before starting the motor 31 the set screws 33 are loosened in sleeve 32 so as to disconnect the motor shaft from the worm shaft 27. Knob 36 is then operated to rotate the torsion head 16 and wire 17 to bring the mirror 23 into the desired starting position. It may be desirable to make this adjustment prior to placing the charged sample cup in position. However, if the adjustment is made after the sample to be tested is in final position, then some little time must be allowed to elapse before the actual measuring operation is begun so as to allow the liquid sample to return to a quiescent state.

Assuming that the parts are in the position shown in Figure 1, with the mirror properly positioned with respect to the lamp and scale 38, motor 31 coupled to shaft 27, and the cup 7 charged with a sample liquid to be tested, the position of the scale on disc 34 is read with respect to the pointer 35, and the motor is then started. The liquid in the cup 7, if it has any thixotropic property will hold the rotor 20 against movement until such time as the torsional force stored in the wire 17 overcomes the shearing force of the particular liquid being tested. Initial movement of the rotor 20 is indicated by a movement of the pencil of light on the scale 38 and at that instant the motor 31 is stopped and the number of rotations and fraction thereof of shaft 27 is indicated. The amount of force required to disturb the oil is a direct function of the amount of rotation of the head 16 necessary to effect movement of the rotor 20, and hence the extent of rotation of the head may be considered as a measure of the thixotropic property of the particular liquid.

In some liquids the thixotropic property is restored after disturbance more rapidly than in other liquids, and this quality of a liquid may be measured by intermittent use of the present measuring instrument.

From the foregoing description and the accompanying drawing it will be apparent to those skilled in the art that we have devised a relatively simple and inexpensive apparatus for measuring a property of liquids which is highly important in commercial fields, that the apparatus is extremely sensitive and therefore highly accurate in operation, and that its construction is such that it may be easily and quickly operated by one having little if any skill in the particular art.

In accordance with the patent statutes we have described what we now believe to be the preferred form of construction of the force measuring apparatus, but it is obvious that many minor changes may be made in the details of construction without departing from the spirit of the invention, and it is intended that all such changes be included within the scope of the appended claims.

What is claimed is:

1. A thixotrometer comprising a sample cup for containing a liquid to be tested, an open-ended cylindrical rotor for use with the cup, a torsion wire for suspending the rotor in a liquid in the cup, means for applying a torsional force directly to the wire, and means associated with the rotor for indicating initial movement thereof.

2. A thixotrometer comprising a sample cup for containing a liquid to be tested, a rotor for use with the cup, a torsion wire for suspending the rotor in a liquid in the cup, a casing for said parts, means for applying a torsional force directly to the wire, said casing being provided with an opening, a reflector rigidly connected to the rotor and in substantial alignment with the opening, and means for projecting a light beam through the opening onto the reflector to indicate the initiation of relative movement between the rotor and cup.

3. A thixotrometer comprising a sample cup for containing a liquid to be tested, a rotor for use with the cup, a torsion wire for suspending the rotor in a liquid in the cup, a motor, gearing for transmitting power from the motor to the torsion wire, a releasable coupling between the motor and gearing, a knob connected with the gearing for manually operating the same when the coupling is released, and means associated with the rotor for indicating the initiation of relative movement between the rotor and cup.

4. In a thixotrometer a casing, a sample cup disposed at the bottom of the casing for containing a liquid to be tested, a rotor for use with the cup, a torsion wire for suspending the rotor in a liquid in the cup, means for applying a torsional force directly to the wire, a level on said casing, a pivot point on which said casing is mounted, and means cooperating with a wall of the casing for adjusting the same to an exact vertical position.

FRANCIS W. GODWIN.
MARTIN H. HEEREN.